US012811053B2

(12) United States Patent
Kim et al.

(10) Patent No.: US 12,811,053 B2
(45) Date of Patent: Nov. 24, 2026

(54) COIL COMPONENT

(71) Applicant: SAMSUNG ELECTRO-MECHANICS CO., LTD., Suwon-si (KR)

(72) Inventors: Boum Seock Kim, Suwon-si (KR); Han Lee, Suwon-si (KR); Byeong Cheol Moon, Suwon-si (KR); Sang Jin Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 887 days.

(21) Appl. No.: 18/093,115

(22) Filed: Jan. 4, 2023

(65) Prior Publication Data

US 2023/0386735 A1 Nov. 30, 2023

(30) Foreign Application Priority Data

May 30, 2022 (KR) ........................ 10-2022-0066363

(51) Int. Cl.

*H01F 27/32* (2006.01)
*H01F 27/02* (2006.01)
*H01F 27/24* (2006.01)
*H01F 27/29* (2006.01)

(52) U.S. Cl.

CPC ........... *H01F 27/322* (2013.01); *H01F 27/02* (2013.01); *H01F 27/24* (2013.01); *H01F 27/292* (2013.01)

(58) Field of Classification Search

CPC ........ H01F 27/02; H01F 27/24; H01F 27/292; H01F 27/322; H01F 27/324; H01F 27/2804; H01F 27/303

See application file for complete search history.

(56) References Cited

U.S. PATENT DOCUMENTS

| | | | | |
|---|---|---|---|---|
| 6,590,486 | B2 * | 7/2003 | Tanaka | H01F 27/245 |
| 8,975,997 | B2 * | 3/2015 | Tonoyama | H01F 17/0013 336/200 |
| 9,852,842 | B2 * | 12/2017 | Park | H01F 17/04 |
| 2011/0279213 | A1 | 11/2011 | Tsuduki et al. | |

(Continued)

FOREIGN PATENT DOCUMENTS

| | | | |
|---|---|---|---|
| JP | 2012-248629 | A | 12/2012 |
| KR | 10-2015-0051983 | A | 5/2015 |

(Continued)

OTHER PUBLICATIONS

Office Action dated Jun. 2, 2026 issued in corresponding to Korean Patent Application No. 10-2022-0066363.

*Primary Examiner* — Malcolm Barnes
(74) *Attorney, Agent, or Firm* — Morgan, Lewis & Bockius LLP

(57) ABSTRACT

A coil component includes a body having first and second surfaces opposing each other, and third and fourth surfaces connected to the first and second surfaces and opposing each other, a support member disposed in the body, a coil disposed on at least one surface of the support member and including at least one turn around a core, a first non-magnetic layer extending from a side surface of the support member to the first to fourth surfaces of the body, and first and second external electrodes disposed on the body and connected to the coil.

3 Claims, 8 Drawing Sheets

(56) References Cited

U.S. PATENT DOCUMENTS

| | | | | |
|---|---|---|---|---|
| 2013/0341758 | A1 * | 12/2013 | Lee | H01F 27/24 257/531 |
| 2020/0105455 | A1 * | 4/2020 | Yoon | H01F 3/10 |
| 2020/0135374 | A1 * | 4/2020 | You | H01F 41/04 |
| 2020/0143976 | A1 * | 5/2020 | Jeon | H01F 1/26 |
| 2021/0005365 | A1 * | 1/2021 | Jung | H01F 27/292 |
| 2021/0110968 | A1 * | 4/2021 | Kim | H01F 27/36 |
| 2021/0193369 | A1 * | 6/2021 | Saito | H01F 27/2804 |
| 2021/0350964 | A1 | 11/2021 | Hwang et al. | |
| 2021/0358684 | A1 * | 11/2021 | Yoon | H01F 27/2804 |

FOREIGN PATENT DOCUMENTS

| | | | |
|---|---|---|---|
| KR | 10-2017-0097493 | A | 8/2017 |
| KR | 10-1994734 | B1 | 7/2019 |
| KR | 10-2016483 | B1 | 9/2019 |
| KR | 10-2093148 | B | 3/2020 |
| KR | 10-2021-0136742 | A | 11/2021 |

* cited by examiner

IV-IV'

COIL COMPONENT

CROSS-REFERENCE TO RELATED APPLICATION(S)

This application claims benefit of priority to Korean Patent Application No. 10-2022-0066363 filed on May 30, 2022 in the Korean Intellectual Property Office, the disclosure of which is incorporated herein by reference in its entirety.

TECHNICAL FIELD

The present disclosure relates to a coil component.

BACKGROUND

An inductor, a coil component, is a passive electronic component used in electronic devices along with a resistor and a capacitor.

As electronic devices have been designed to have high-performance and a reduced size, the number of electronic components used in electronic devices has been increased and sizes thereof have been reduced.

Meanwhile, a power inductor may have properties in which, when a current (Isat) of a certain magnitude or more flows, magnetic flux density may be saturated and inductance may decrease. Accordingly, there has been demand for a coil component having a high Isat such that inductance may be maintained even when a high current flows.

SUMMARY

An aspect of the present disclosure is to provide a coil component in which, by disposing a non-magnetic layer in a magnetic path around a coil, current (Isat) properties in which magnetic flux is saturated may improve.

Another aspect of the present disclosure is to, by reducing a lead time by retaining a portion of a support member in a coil component without trimming without adding another process and using the portion as a non-magnetic layer, increase production efficiency.

According to an aspect of the present disclosure, a coil component includes a body having first and second surfaces opposing each other, and third and fourth surfaces connected to the first and second surfaces and opposing each other, a support member disposed in the body, a coil disposed on at least one surface of the support member and including at least one turn around a core, a first non-magnetic layer extending from a side surface of the support member to the first to fourth surfaces of the body, and first and second external electrodes disposed on the body and connected to the coil.

According to an aspect of the present disclosure, a coil component includes a body having first and second surfaces opposing each other, and third and fourth surfaces connected to the first and second surfaces and opposing each other, a coil embedded in the body, a non-magnetic layer, on which the coil is disposed, extending from the first to fourth surfaces of the body, and first and second external electrodes disposed on the body and connected to the coil.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
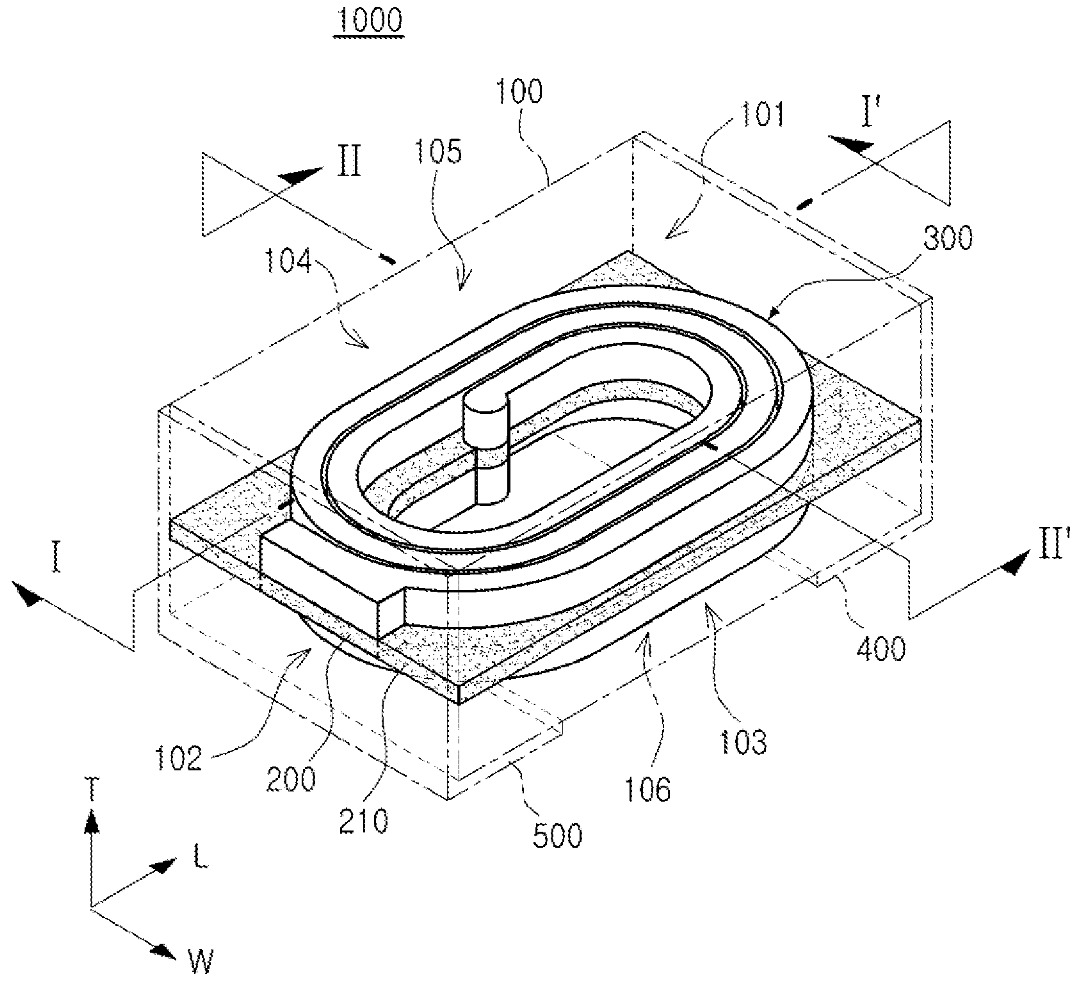
FIG. 1 is a perspective diagram illustrating a coil component according to a first embodiment of the present disclosure.

The terms used in the example embodiments are used to simply describe an example embodiment, and are not intended to limit the present disclosure. A singular term includes a plural form unless otherwise indicated. The terms, “include,” “comprise,” “may be configured to,” and the like, of the description are used to indicate the presence of features, numbers, steps, operations, elements, portions or combination thereof, and do not exclude the possibilities of combination or addition of one or more features, numbers, steps, operations, elements, portions or combination thereof. Also, the term “disposed on,” “disposed on,” and the like, may indicate that an element is disposed on or beneath an object, and may not necessarily mean that the element is disposed on the object with reference to a gravity direction.

Terms such as “coupled to,” “combined with,” and the like, may not only indicate that elements are directly and physically in contact with each other, but also include the configuration in which the other element is interposed between the elements such that the elements are also in contact with the other component.

The size and thickness of each component in the drawings may be arbitrarily indicated for ease of description, and thus, the present disclosure is not necessarily limited to the illustrated examples.

In the drawings, an L direction is a first direction or a length direction, a W direction is a second direction or a width direction, a T direction is a third direction or a thickness direction.

Hereinafter, a coil component according to an example embodiment will be described in detail with reference to the accompanying drawings, and in the description with reference to the accompanying drawings, the same or corresponding components may be provided with the same reference numerals and overlapping description thereof will not be provided.

In electronic devices, various types of electronic components may be used, and various types of coil components may be used between the electronic components to remove noise, or for other purposes.

In other words, in electronic devices, a coil component may be used as a power inductor, a high frequency inductor (HF inductor), a general bead, a high frequency bead (GHz bead), a common mode filter, and the like.

First Embodiment

Figure 2:
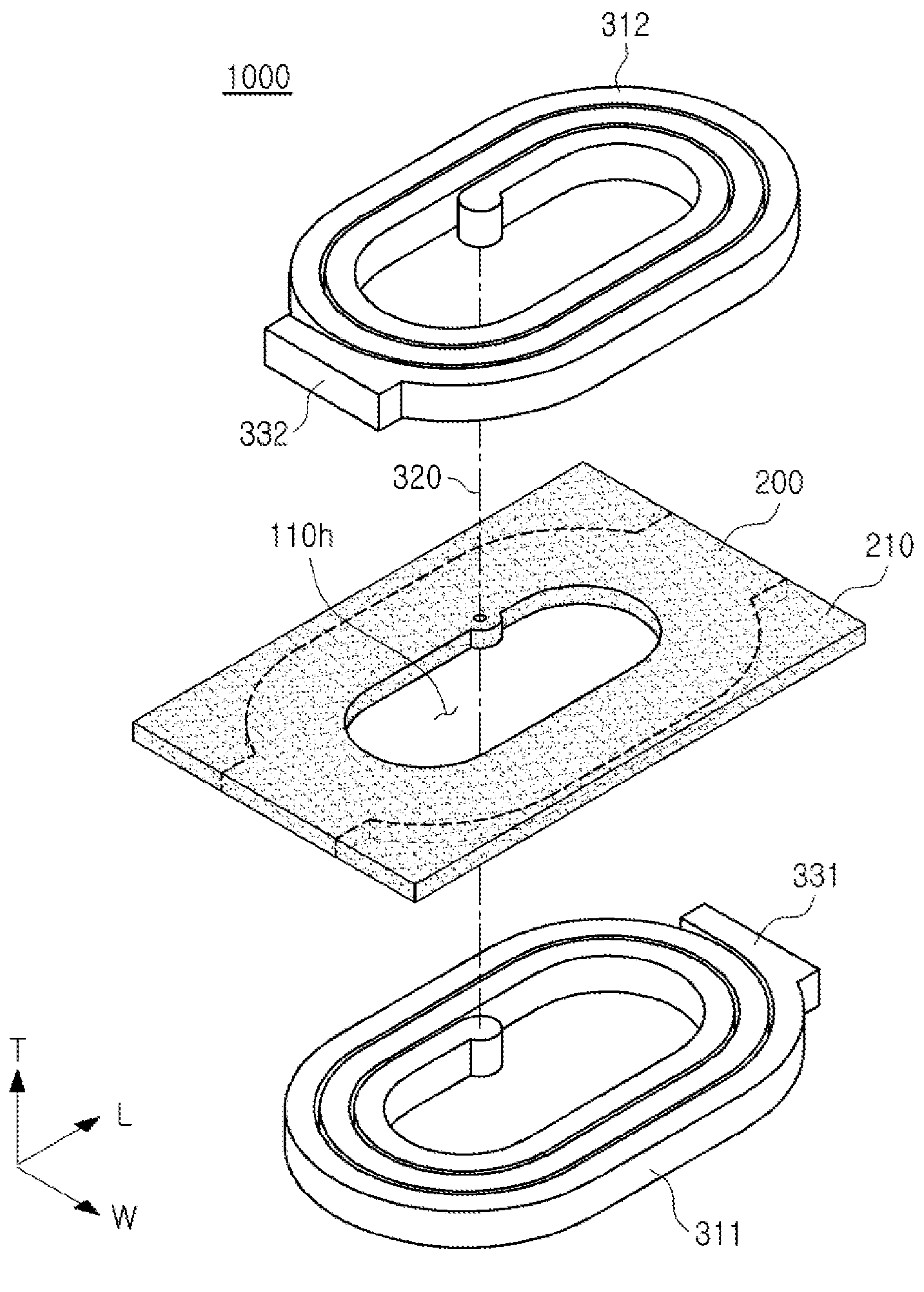
FIG. 2 is an assembly diagram illustrating connection relationship between the components in FIG. 1.
Figure 3:
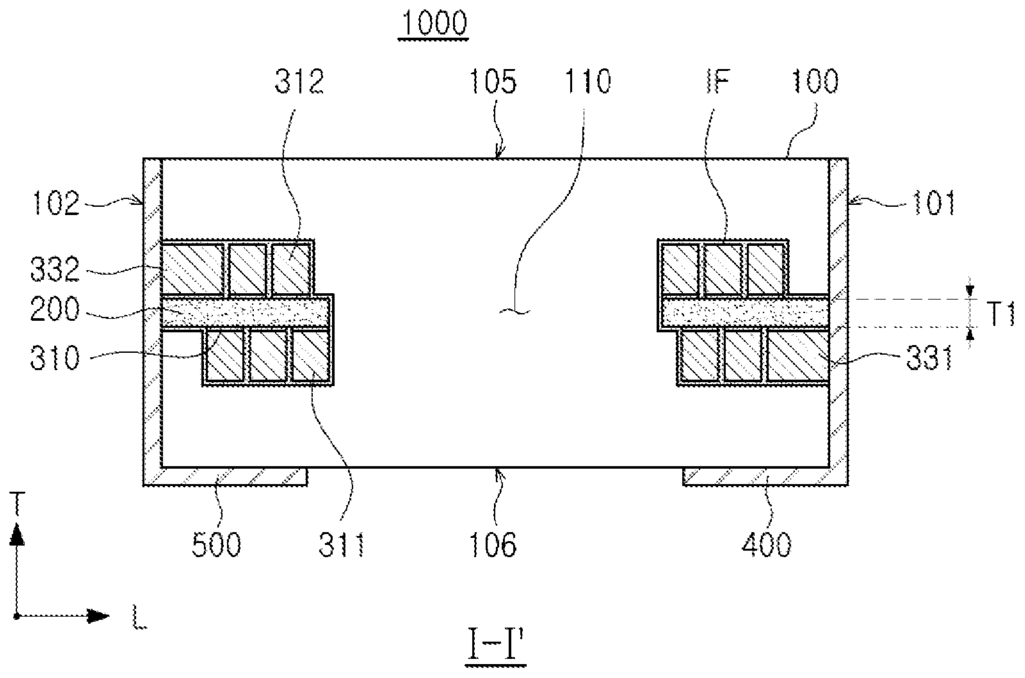
FIG. 3 is a cross-sectional diagram taken along line I-I' in FIG. 1.
Figure 4:
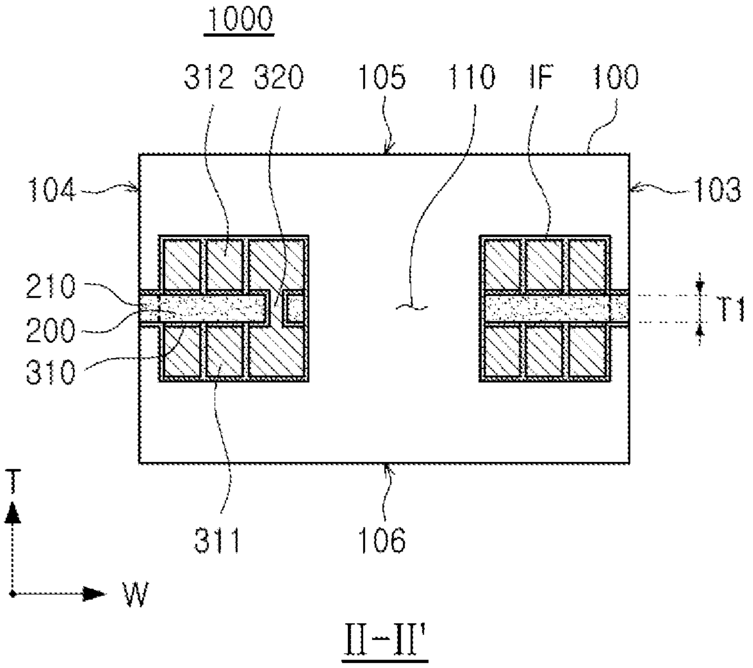
FIG. 4 is a cross-sectional diagram taken along line II-II' in FIG. 1.

FIG. 1 is a perspective diagram illustrating a coil component according to a first embodiment. FIG. 2 is an assembly diagram illustrating a connection relationship between the components in FIG. 1. FIG. 3 is a cross-sectional diagram taken along line I-I' in FIG. 1. FIG. 4 is a cross-sectional diagram taken along line II-II' in FIG. 1.

To more clearly illustrate the coupling between the components, the external insulating layer disposed on the body 100 applied to the example embodiment is not illustrated.

Referring to FIGS. 1 to 4, the coil component 1000 according to the first embodiment may include a body 100, a support member 200, a first non-magnetic layer 210, a coil 300, and first and second external electrodes 400 and 500, and may further include an insulating film IF.

The body 100 may form an exterior of the coil component 1000 in the example embodiment, and the coil 300 and the support member 200 may be disposed therein.

The body 100 may have a hexahedral shape.

The body 100 may include a first surface 101 and a second surface 102 opposing each other in the first direction (the length direction L), a third surface 103 and a fourth surface 104 opposing each other in the second direction (in the width direction W), and a fifth surface 105 and a sixth surface 106 opposing each other in the third direction (in the thickness direction T), with respect to the directions in FIG. 1. Each of the first to fourth surfaces 101, 102, 103 and 104 of the body 100 may be a wall surface of the body 100 connecting the fifth surface 105 to the sixth surface 106 of the body 100. Hereinafter, both end surfaces (one end surface and the other end surface) of the body 100 may refer to the first surface 101 and the second surface 102 of the body 100, both side surfaces (one side surface and the other side surface) of the body 100 may refer to the third surface 103 and the fourth surface 104 of the body 100, and one surface and the other surface of the body 100 may refer to the sixth surface 106 and the fifth surface 105 of the body 100.

The body 100 may be formed such that the coil component in which the external electrodes 400 and 500 are formed may have a length of 2.5 mm, a width of 2.0 mm and a thickness of 1.0 mm, may have a length of 2.0 mm, a width of 1.2 mm and a thickness of 1.0 mm, may have a length of 2.0 mm, a width of 1.2 mm and a thickness of 0.65 mm, may a length of 1.6 mm, a width of 0.8 mm and a thickness of 0.8 mm, may have a length of 1.0 mm, a width of 0.5 mm and a thickness of 0.5 mm, or may have a length of 0.8 mm, a width of 0.4 mm and a thickness of 0.65 mm, but an example embodiment thereof is not limited thereto. Since the above-described numerical value examples for the length, width, and thickness of the coil component 1000 do not reflect process errors, and a numerical value in a range recognized as a process error may correspond to the above-described numerical value examples.

The length of the above-described coil component 1000 may be a maximum value among dimensions of a plurality of line segments connecting two outermost boundary lines of the coil component 1000, opposing each other in the length direction L, to each other and in parallel to the length direction L, with respect to an optical microscope image or a scanning electron microscope (SEM) image with respect to a cross-section in the length direction L-thickness direction T taken from the central portion of the coil component 1000 taken in the width direction W. Alternatively, the length of the coil component 1000 may refer to a minimum value among the dimensions of the plurality of line segments connecting two outermost boundary lines of the coil component 1000, opposing each other in the length direction L, to each other and in parallel to the length direction L. Alternatively, the length of the coil component 1000 may refer to an arithmetic mean value of at least three or more of the dimensions of the plurality of line segments described above. Here, the plurality of line segments parallel to the length direction L may be spaced apart from each other by an equal distance in the thickness direction T, but an example embodiment thereof is not limited thereto.

The thickness of the above-described coil component 1000 be a maximum value among dimensions of a plurality of line segments connecting two outermost boundary lines of the coil component 1000, opposing each other in the thickness direction T, to each other and in parallel to the thickness direction T, with respect to an optical microscope image or a scanning electron microscope (SEM) image with respect to a cross-section in the length direction L-thickness direction T taken from the central portion of the coil component 1000 taken in the width direction W. Alternatively, the length of the coil component 1000 may refer to a minimum value among the dimensions of the plurality of line segments connecting two outermost boundary lines of the coil component 1000, opposing each other in the length direction T, to each other and in parallel to the length direction T. Alternatively, the length of the coil component 1000 may refer to an arithmetic mean value of at least three or more of the dimensions of the plurality of line segments described above. Here, the plurality of line segments parallel to the thickness direction T may be spaced apart from each other by an equal distance in the thickness direction T, but an example embodiment thereof is not limited thereto.

The width of the above-described coil component 1000 may be a maximum value among dimensions of a plurality of line segments connecting two outermost boundary lines of the coil component 1000, opposing each other in the width direction W, to each other and in parallel to the width direction W, with respect to an optical microscope image or a scanning electron microscope (SEM) image with respect to a cross-section in the length direction L-width direction W taken from the central portion of the coil component 1000 taken in the thickness direction T. Alternatively, the width of the coil component 1000 may refer to a minimum value among the dimensions of the plurality of line segments connecting two outermost boundary lines of the coil component 1000, opposing each other in the width direction W, to each other and in parallel to the width direction W. Alternatively, the width of the coil component 1000 may refer to an arithmetic mean value of at least three or more of the dimensions of the plurality of line segments connecting two outermost boundary lines of the coil component 1000, opposing each other in the width direction W, to each other and in parallel to the width direction W. Here, the plurality of line segments parallel to the width direction W may be spaced apart from each other by an equal distance in the thickness direction T, but an example embodiment thereof is not limited thereto.

Alternatively, each of the length, width and thickness of the coil component 1000 may be measured by a micrometer measurement method. The micrometer measurement method may be of determining a zero point with a gage repeatability and reproducibility (R&R) micrometer, inserting the coil component 1000 in the example embodiment between tips of the micrometer, and measuring by turning a measuring lever of a micrometer. In measuring the length of the coil component 1000 by the micrometer measurement method, the length of the coil component 1000 may refer to a value measured once or may refer to an arithmetic average of values measured a plurality of times, which may be equally applied to the width and thickness of the coil component 1000.

The body 100 may include an insulating resin and a magnetic material. Specifically, the body 100 may be formed by laminating one or more magnetic composite sheets in which a magnetic material is dispersed in an insulating resin. The magnetic material may be ferrite or metallic magnetic powder.

A ferrite powder may be at least one of, for example, spinel-type ferrite such as Mg—Zn-based ferrite, Mn—Zn-based ferrite, Mn—Mg-based ferrite, Cu—Zn-based ferrite, Mg—Mn—Sr-based ferrite, Ni—Zn-based ferrite, hexagonal ferrites such as Ba—Zn-based ferrite, Ba—Mg-based ferrite, Ba—Ni-based ferrite, Ba—Co-based ferrite, Ba—Ni—Co-based ferrite, garnet-type ferrites such as Y-based ferrite, and Li-based ferrites.

Metal magnetic powder may include one or more selected from a group consisting of iron (Fe), silicon (Si), chromium (Cr), cobalt (Co), molybdenum (Mo), aluminum (Al), niobium (Nb), copper (Cu) and nickel (Ni). For example, the magnetic metal powder may be at least one of pure iron powder, Fe—Si alloy powder, Fe—Si—Al alloy powder, Fe—Ni alloy powder, Fe—Ni—Mo alloy powder, Fe—Ni—Mo—Cu alloy powder, Fe—Co alloy powder, Fe—Ni—Co alloy powder, Fe—Cr alloy powder, Fe—Cr—Si alloy powder, Fe—Si—Cu—Nb alloy powder, Fe—Ni—Cr-based alloy powder and Fe—Cr—Al alloy powder.

The metal magnetic powder may be amorphous or crystalline. For example, the magnetic metal powder may be a Fe—Si—B—Cr amorphous alloy powder, but an example embodiment thereof is not limited thereto.

Each particle of ferrite and magnetic metal powder may have an average diameter of about 0.1 μm to 30 μm, but an example embodiment thereof is not limited thereto.

The body 100 may include two or more types of magnetic materials dispersed in a resin. Here, the different types of magnetic materials may indicate that the magnetic materials dispersed in the resin may be distinguished from each other by one of an average diameter, composition, crystallinity, and shape.

In the description below, it will be assumed that the magnetic material is a magnetic metal powder, but an example embodiment thereof is not limited to the body 100 having a structure in which magnetic metal powder is dispersed in an insulating resin.

The insulating resin may include epoxy, polyimide, a liquid crystal polymer, or the like, alone or in combination but an example embodiment thereof is not limited thereto.

Referring to FIGS. 3 and 4, the body 100 may include a core 110 penetrating through the support member 200 and the coil 300. The core 110 may be formed by filling the through-hole **110*h* penetrating the center of the coil 300 and the center of the support member 200** with a magnetic composite sheet including a magnetic material, but an example embodiment thereof is not limited thereto.

The support member 200 may be disposed in the body 100. The support member 200 may be configured to support the coil 300. Also, the central portion of the support member 200 may be removed through a trimming process such that a through-hole **110*h* may be formed, and a core 110 may be disposed in the through-hole 110*h*. Here, the through-hole 110*h* formed in the support member 200 may be formed in a shape corresponding to the shape of the innermost turn of the coil 300**.

The support member 200 may be formed of a thermosetting insulating resin such as an epoxy resin, a thermoplastic insulating resin such as polyimide, or an insulating material including a photosensitive insulating resin, or an insulating material in which the insulating resin is impregnated with a reinforcing material such as glass fiber or inorganic filler. For example, the support member 200 may be formed of an insulating material such as prepreg, Ajinomoto build-up film (ABF), FR-4, bismaleimide triazine (BT) film, and photo imaginable dielectric (PID) film, but an example embodiment thereof is not limited thereto.

As inorganic fillers, at least one selected from a group consisting of silica ($SiO_2$), alumina ($Al_2O_3$), silicon carbide (SiC), barium sulfate ($BaSO_4$), talc, mud, mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$) and calcium zirconate ($CaZrO_3$) may be used.

When the support member 200 is formed of an insulating material including a reinforcing material, the support member 200 may provide excellent rigidity. When the support member 200 is formed of an insulating material that does not include glass fibers, it may be advantageous to reduce the thickness of the coil component 1000 according to the example embodiment. Also, with respect to the body 100 of the same size, the volume occupied by the coil 300 and/or the magnetic metal powder may be increased, thereby improving component properties. When the support member 200 is formed of an insulating material including a photosensitive insulating resin, the number of processes for forming the coil 300 may be reduced, which is advantageous in reducing production costs, and fine vias 320 may be formed.

The thickness of the support member 200 may be, for example, 10 μm or more and 50 μm or less, but an example embodiment thereof is not limited thereto.

The coil 300 may be disposed in the body 100, and may exhibit properties of the coil component 1000. For example, when the coil component 1000 of the example embodiment is used as a power inductor, the coil 300 may maintain an output voltage by storing an electric field as a magnetic field, thereby stabilizing the power of the electronic device.

The coil component 1000 according to the example embodiment may include a coil 300 supported by the support member 200 in the body 100. The coil 300 may form a turn around the core 110.

Referring to FIGS. 1 to 4, the coil 300 may include first and second coil patterns 311 and 312, a via 320, and first and second lead-out portions 331 and 332. Specifically, with respect to the direction in FIG. 1, the first coil pattern 311 and the first lead-out portion 331 may be disposed on one surface of the support member 200 opposing the sixth surface 106 of the body 100, and the second coil pattern 312 and the second lead-out portion 332 may be disposed on the other surface of the support member 200 opposing the fifth surface 105 of the body 100.

Referring to FIGS. 1 to 4, each of the first coil pattern 311 and the second coil pattern 312 may have at least one turn about the core 110 as an axis. Each of the first coil pattern 311 and the second coil pattern 312 may have a planar spiral shape.

The first coil pattern 311 may form at least one turn about the core 110 as an axis on one surface of the support member 200. The second coil pattern 312 may form at least one turn about the core 110 as an axis on the other surface of the support member 200.

Referring to FIGS. 2 and 4, the coil 300 may include a via 320 penetrating through the support member 200 and connecting the first and second coil patterns 311 and 312 on both surfaces of the support member 200 to each other.

The via 320 may electrically connect the first and second coil patterns 311 and 312 disposed on both surfaces of the support member 200 to each other. Specifically, with respect to the direction in FIG. 1, the lower surface of the via 320 may be connected to the end of the innermost turn of the first coil pattern 311, and the upper surface of the via 320 may be connected to the end of the innermost turn of the second coil pattern 312.

Referring to FIGS. 2 and 3, the coil 300 may include first and second lead-out portions 331 and 332 exposed to (or extending from or being in contact with) the first and second surfaces 101 and 102 of the body 100, respectively.

The first lead-out portion 331 may be connected to the first coil pattern 311, may be exposed to (or extend from or be in contact with) the first surface 101 of the body 100, and may be connected to the first external electrode 400. Also, the second lead-out portion 332 may be connected to the second coil pattern 312, may be exposed to (or extend from or be in contact with) the second surface 102 of the body 100, and may be connected to the second external electrode 500.

That is, the input from the first external electrode 400 may pass through the first lead-out portion 331, the first coil pattern 311, the via 320, the second coil pattern 312, and the second lead-out portion in sequence and may output through the second external electrode 500.

Accordingly, the coil 300 may function as a single coil between the first and second external electrodes 400 and 500.

At least one of the first and second coil patterns 311 and 312, the via 320, and the first and second lead-out portions 331 and 332 may include at least one conductive layer.

For example, referring to FIGS. 3 and 4, when the first coil pattern 311, the via 320, and the first lead-out portion 331 are formed on one surface of the support member 200 by plating, each of the first coil pattern 311, the via 320, and the first lead-out portion 331 may include a seed layer 310 and an electrolytic plating layer. Here, the electroplating layer may have a monolayer structure or a multilayer structure. The electrolytic plating layer having a multilayer structure may be formed in a conformal film structure in which an electroplating layer is formed along the surface of the other electroplating layer, or an electroplating layer may be laminated only on the other surface of one electroplating layer. The seed layer 310 may be formed by an electroless plating method or a vapor deposition method such as sputtering. The seed layers 310 of the first coil pattern 311, the first via 321, and the first lead-out portion 331 may be integrally formed such that a boundary may not be formed therebetween, but an example embodiment thereof is not limited thereto. The electroplating layers of the first coil pattern 311, the first via 321, and the first lead-out portion 331 may be integrally formed such that a boundary may not be formed therebetween, but an example embodiment thereof is not limited thereto.

Each of the first coil pattern 311, the first via 320, and the first lead-out portion 331 may be formed of a conductive material such as copper (Cu), aluminum (Al), silver (Ag), tin (Sn), gold (Au), nickel (Ni), lead (Pb), titanium (Ti), chromium (Cr), or alloys thereof, but an example embodiment thereof is not limited thereto.

Referring to FIGS. 1, 2 and 4, the coil component 1000 according to the example embodiment may include the first non-magnetic layer 210. Specifically, the outer region of the support member 200 other than the region in which the coil 300 disposed is not removed and remains, the region may function as the first non-magnetic layer 210 which may increase the current Isat at which the magnetic flux of the coil 300 is saturated.

That is, in a general coil component, it may be common to remove the outer region of the support member other than the region in which the coil is disposed through a trimming process to increase the magnetic material, but in the example embodiment, the outer region of the support member 200 other than the region in which the coil 300 is disposed may remain, such that the region may function as the first non-magnetic layer 210 for increasing Isat of the coil component 1000. Referring to FIGS. 1 to 4, the first non-magnetic layer 210 may extend from the external side surface of the support member 200 to the first to fourth surfaces 101, 102, 103, and 104 of the body 100. Here, the external side surface of the support member 200 may refer to the side surfaces facing the first to fourth surfaces 101, 102, 103 and 104 of the body 100 among the side surfaces connecting one surface and the other surface of the support member 200 opposing each other in the thickness direction T to each other.

Referring to FIG. 1, the first non-magnetic layer 210 may include a plurality of side surfaces connecting one surface and the other surface opposing each other to each other, and a plurality of side surfaces connecting one surface to the other surface, and at least one of the side surfaces of the first non-magnetic layer 210 may be coplanar with the first to fourth surfaces 101, 102, 103, and 104 of the body 100.

That is, the first non-magnetic layer 210 may be configured together in the same process of forming the support member 200, and when the body 100 of the individual coil component 1000 is formed by a dicing process, the first non-magnetic layer 210 may also be diced together, such that at least one of the side surfaces of the first non-magnetic layer 210 may be coplanar with the first to fourth surfaces 101, 102, 103, and 104 of the body 100.

Referring to FIGS. 3 and 4, the average thickness T1 of the first non-magnetic layer 210 may be configured to be substantially the same as the average thickness T1 of the support member 200. In this case, the configuration in which the thicknesses are substantially the same may include process errors or positional deviations occurring during the manufacturing process, and errors during measurement.

For example, the average thickness T1 of the first non-magnetic layer 210 may be configured to be 22 μm, but an example embodiment thereof is not limited thereto.

Here, the average thickness T1 of the first non-magnetic layer 210 may refer to, for example, an arithmetic mean value of at least three or more of the dimensions of a plurality of line segments connecting two outermost boundary lines of the first non-magnetic layer 210, opposing each other in the thickness direction T, to each other and in parallel to the thickness direction T, with respect to an optical microscope image or a scanning electron microscope (SEM) image for an width direction W-thickness direction T cross-section taken from the central portion of the coil component 1000 taken in the length direction L. Here, the plurality of line segments parallel to the thickness direction T may be spaced apart from each other by an equal distance in the width direction W, but an example embodiment thereof is not limited thereto.

Meanwhile, the average thickness T1 of the support member 200 may also be measured by the same method of measuring the thickness of the first non-magnetic layer 210 described above.

The first non-magnetic layer 210 may include the same material as that of the support member 200.

The first non-magnetic layer 210 may be formed in the same process of forming the support member 200 and may formed of a thermosetting insulating resin such as an epoxy resin, a thermoplastic insulating resin such as polyimide, or an insulating material including a photosensitive insulating resin, or an insulating material in which the insulating resin is impregnated with a reinforcing material such as glass fiber or inorganic filler. For example, the first non-magnetic layer 210 may be formed of an insulating material such as prepreg, Ajinomoto build-up film (ABF), FR-4, bismaleimide triazine (BT) film, and photo imaginable dielectric (PID) film, but an example embodiment thereof is not limited thereto.

As inorganic fillers, at least one selected from a group consisting of silica ($SiO_2$), alumina ($Al_2O_3$), silicon carbide (SiC), barium sulfate ($BaSO_4$), talc, mud, mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$) and calcium zirconate ($CaZrO_3$) may be used.

As described above, by disposing the first non-magnetic layer 210 including a non-magnetic material in the magnetic path around the coil 300, the current Isat at which the magnetic flux density is saturated may be increased, and accordingly, the coil component 1000 in which Isat properties may be improved to maintain inductance even when a high current is applied may be provided.

Referring to FIGS. 2 and 4, although the interfacial surface is marked by a dotted line for distinction between the components, but the first non-magnetic layer 210 may be integrally formed with the support member 200. Here, the configuration in which the first non-magnetic layer 210 and the support member 200 are integrally formed may indicate that a boundary line or a boundary surface is not formed between the first non-magnetic layer 210 and the support member 200.

However, an example embodiment thereof is not limited thereto, and when it is necessary to adjust magnetic permeability of the first non-magnetic layer 210 to be a constant value different from that of the support member 200, the first non-magnetic layer 210 may be formed of a material different from that of the support member 200 such that a boundary line or a boundary surface may be formed between the first non-magnetic layer 210 and the support member 200.

Referring to FIGS. 3 and 4, the coil component 1000 according to the example embodiment may further include an insulating film IF. The insulating film IF may integrally cover the coil 300, the support member 200, and the first non-magnetic layer 210.

Specifically, the insulating film IF may be disposed between the coil 300 and the body 100, between the support member 200 and the body 100, and between the first non-magnetic layer 210 and the body 100. The insulating film IF may be formed along the surface of the support member 200 on which the first and second coil patterns 311 and 312 and the first and second lead-out portions 331 and 332 are disposed, but an example embodiment thereof is not limited thereto.

The insulating film IF may fill regions between adjacent turns of the first and second coil patterns 311 and 312 and between the first and second lead-out portions 331 and 332 and the first and second coil patterns 311 and 312, respectively, and may insulate the coil turns from each other.

The insulating film IF may be provided to insulate the coil 300 from the body 100, and may include a well-known insulating material such as paraline, but an example embodiment thereof is not limited thereto. As another example, the insulating film IF may include an insulating material such as an epoxy resin other than paraline. The insulating film IF may be formed by vapor deposition, but an example embodiment thereof is not limited thereto. As another example, the insulating film IF may be formed by laminating and curing an insulating film on the support member 200 on which the coil 300 is disposed, or may be formed by coating and curing an insulating paste on both surfaces of the support member 200 on which the coil 300 is disposed. Accordingly, the insulating film IF may not be provided in the example embodiment. That is, in the case in which the body 100 has sufficient electrical resistance at the designed operating current and voltage of the coil component 1000 according to the example embodiment, the insulating film IF may not be provided in the example embodiment.

The external electrodes 400 and 500 may be spaced apart from each other on the body 100 and may be connected to the coil 300. Specifically, the first external electrode 400 may be disposed on the first surface 101 of the body 100, and may be in contact with and connected to the first lead-out portion 331 exposed to the first surface 101 of the body 100, and the second external electrode 500 may be disposed on the second surface 102 of the body 100 and may be in contact with and connected to the second lead-out portion 332 exposed to the second surface 102 of the body 100.

The first external electrode 400 may be disposed on the first surface 101 of the body 100 and may extend to at least a portion of the third to sixth surfaces 103, 104, 105, and 106 of the body 100. The second external electrode 500 may be disposed on the second surface 102 of the body 100 and may extend to at least a portion of the third to sixth surfaces 103, 104, 105 and 106 of the body 100.

Referring to FIGS. 1 and 3, the coil component 1000 according to the example embodiment may have a structure in which the first and second external electrodes 400 and 500 disposed on the first surface 101 and the second surface 102 of the body 100, respectively, may extend only to the sixth surface 106 of the body 100.

In this case, the first external electrode 400 may include a first pad portion disposed on the sixth surface 106 of the body 100, and a first extension portion disposed on the first surface 101 of the body 100 and connecting the first lead-out portion 331 to the first pad portion.

Also, the second external electrode 500 may include a second pad portion spaced apart from the first pad portion on the sixth surface 106 of the body 100, and a second extension portion disposed on the second surface 102 of the body 100 and connecting the second lead-out portion 332 to the second pad portion.

The pad portion and the extension portion may be configured together in the same process and may be integrally formed without forming a boundary therebetween, but an example embodiment thereof is not limited thereto.

The external electrodes 400 and 500 may be formed by a vapor deposition method such as sputtering and/or a plating method, but an example embodiment thereof is not limited thereto.

The external electrodes 400 and 500 may be formed of a conductive material such as copper (Cu), aluminum (Al), silver (Ag), tin (Sn), gold (Au), nickel (Ni), lead (Pb), chromium (Cr), titanium (Ti), or alloys thereof, but an example embodiment thereof is not limited thereto.

The external electrodes 400 and 500 may be formed in a monolayer structure or multilayer structure. For example, the external electrodes 400 and 500 may include a first conductive layer including copper (Cu), a second conductive layer disposed on the first conductive layer and including nickel (Ni), and a third conductive layer disposed on the second conductive layer and including tin (Sn). At least one of the second conductive layer and the third conductive layer may be configured to cover the first conductive layer, but an example embodiment thereof is not limited thereto. The first conductive layer may be a plating layer or a conductive resin layer formed by coating and curing a conductive resin including a conductive powder including at least one of copper (Cu) and silver (Ag) and a resin. The second and third conductive layers may be configured as plating layers, but an example embodiment thereof is not limited thereto.

The coil component 1000 according to the example embodiment may further include an external insulating layer disposed on the third to sixth surfaces 103, 104, 105, and 106 of the body 100. The external insulating layer may be disposed on a region other than the region in which the external electrodes 400 and 500 are disposed among the surfaces of the body 100.

At least a portion of the external insulating layers disposed on the third to sixth surfaces 103, 104, 105, and 106 of the body 100, respectively, may be formed in the same process and may be integrated with each other without forming a boundary therebetween, but an example embodiment thereof is not limited thereto.

The external insulating layer may be formed by forming an insulating material for forming the external insulating layer by a method such as a printing method, vapor deposition, spray application method, film lamination method, or the like, but an example embodiment thereof is not limited thereto.

The external insulating layer may include a thermoplastic resin such as polystyrene resin, vinyl acetate resin, polyester resin, polyethylene resin, polypropylene resin, polyamide resin, rubber resin, acrylic resin, a thermosetting resin such as phenolic resin, epoxy resin, urethane resin, melamine resin, and alkyd resin, a photosensitive resin, parallen, $SiO_x$, or $SiN_x$. The outer insulating layer may further include an insulating filler such as an inorganic filler, but an example embodiment thereof is not limited thereto.

Second Embodiment

Figure 5:
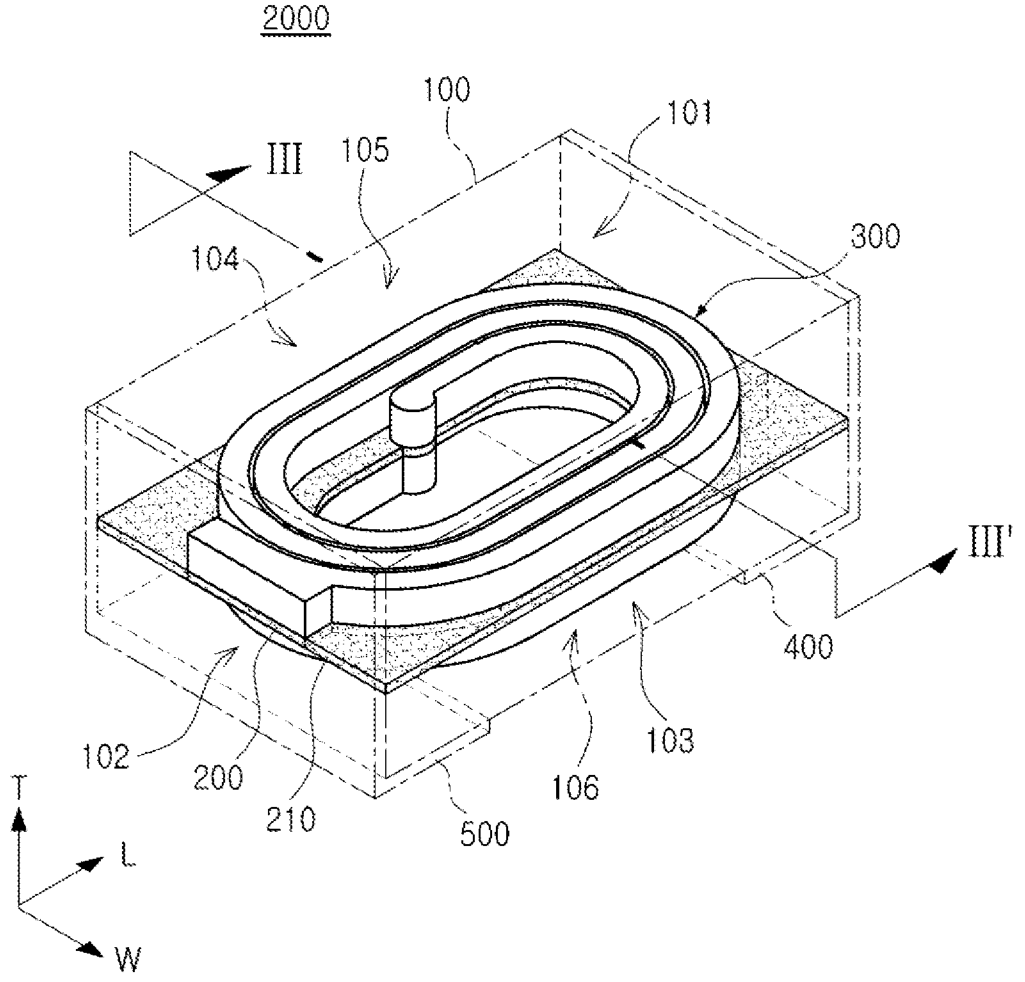
FIG. 5 is a perspective diagram illustrating a coil component according to a second embodiment of the present disclosure.
Figure 6:
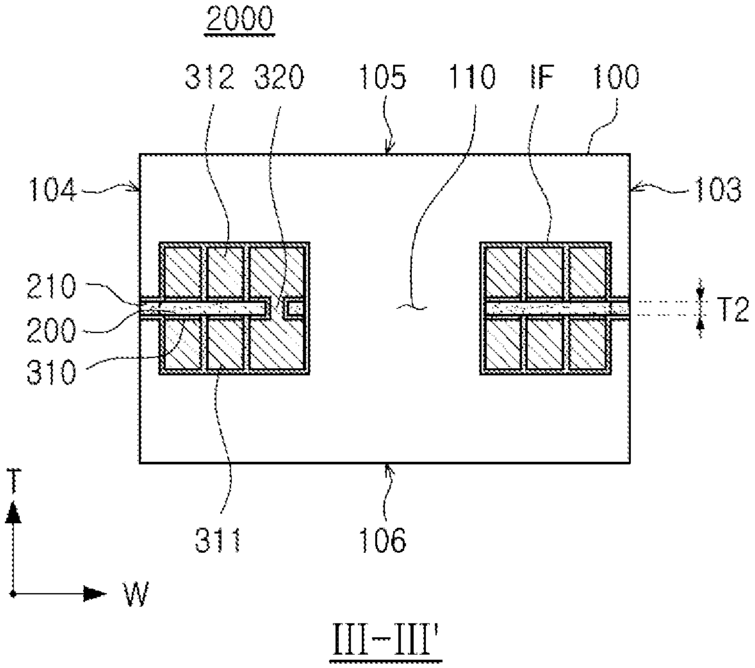
FIG. 6 is a cross-sectional diagram taken along line III-III' in FIG. 5, corresponding to FIG. 4.

FIG. 5 is a perspective diagram illustrating a coil component according to a second embodiment. FIG. 6 is a cross-sectional diagram taken along line III-III' in FIG. 5, corresponding to FIG. 4.

Referring to FIGS. 5 to 6, the coil component 2000 according to the second embodiment may be different from the coil component 1000 according to the first embodiment in that the thickness T2 of the first non-magnetic layer may be different in the coil component 2000.

Accordingly, in describing the example embodiment, only the thickness T2 of the first non-magnetic layer 210 different from that of the first embodiment will be described. For the rest of the components of the example embodiment, the description in the first embodiment may be applied as is.

Referring to FIG. 6, the average thickness T2 of the first non-magnetic layer 210 in the coil component 2000 according to the example embodiment may be thinner than the average thickness T1 of the first non-magnetic layer 210 in the first embodiment. In the example embodiment, the average thickness T2 of the first non-magnetic layer 210 may be less than ½ of the average thickness T1 of the first non-magnetic layer 210 according to the first embodiment. For example, in the example embodiment, the average thickness T2 of the first non-magnetic layer 210 may be 10 μm, but an example embodiment thereof is not limited thereto.

Since the average thickness T2 of the support member 200 may be configured to be the same as the average thickness T2 of the first non-magnetic layer 210, in the example embodiment, the average thickness T2 of the support member 200 may be configured to be 10 μm, but an example embodiment thereof is not limited thereto.

When the average thickness T2 of the first non-magnetic layer 210 is configured to be relatively thin as in the example embodiment, even when a magnetic material having magnetic permeability lower than in the first embodiment is included in the body 100, the same level of Isat properties as in the first embodiment may be implemented.

According to the result of the experiment, when the average thickness of the first non-magnetic layer 210 was configured to be 22 μm as in the coil component 1000 according to the first embodiment, magnetic permeability of the magnetic material in the body 100 to have a desired Isat properties was 38, whereas, it was confirmed that, when the average thickness of the first non-magnetic layer 210 was configured to be 10 μm as in the coil component 2000 according to the example embodiment, by using the magnetic material having magnetic permeability of 34, the same level of Isat properties was able to be implemented.

Third Embodiment

Figure 7:
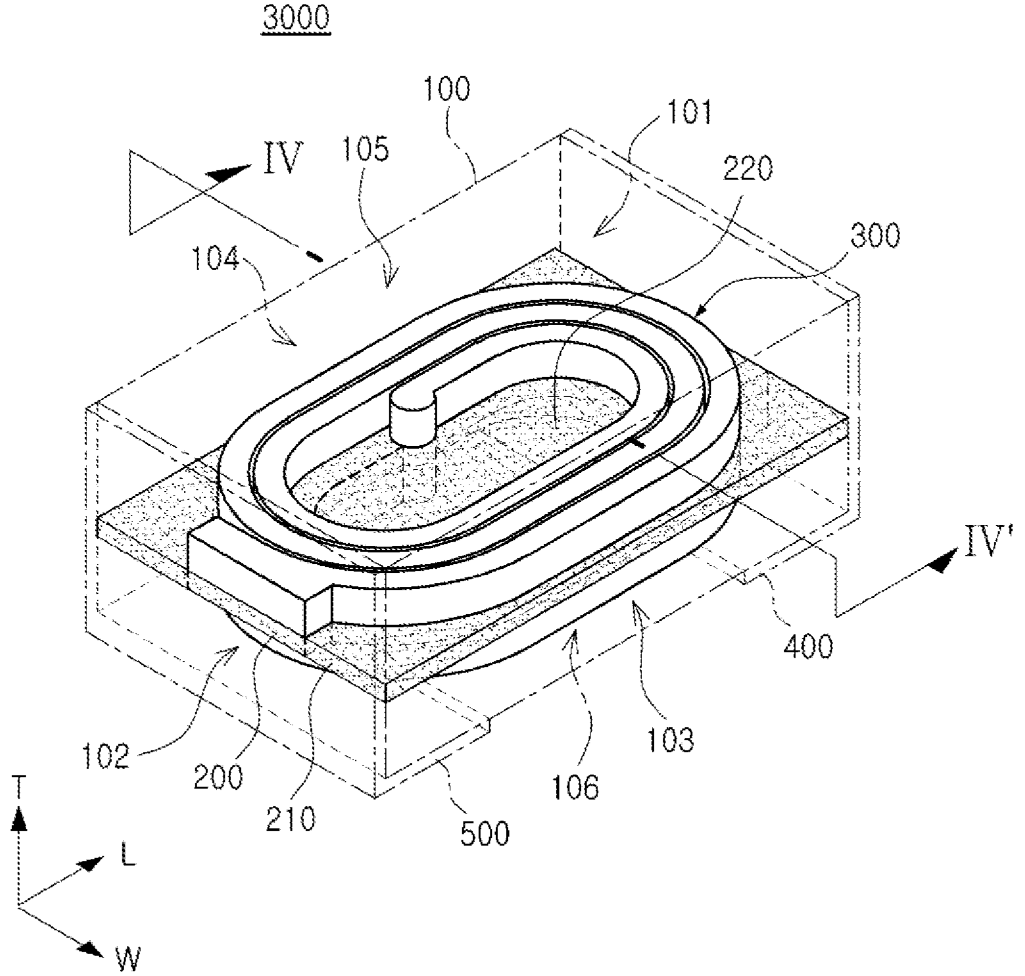
FIG. 7 is a perspective diagram illustrating a coil component according to a third embodiment of the present disclosure.
Figure 8:
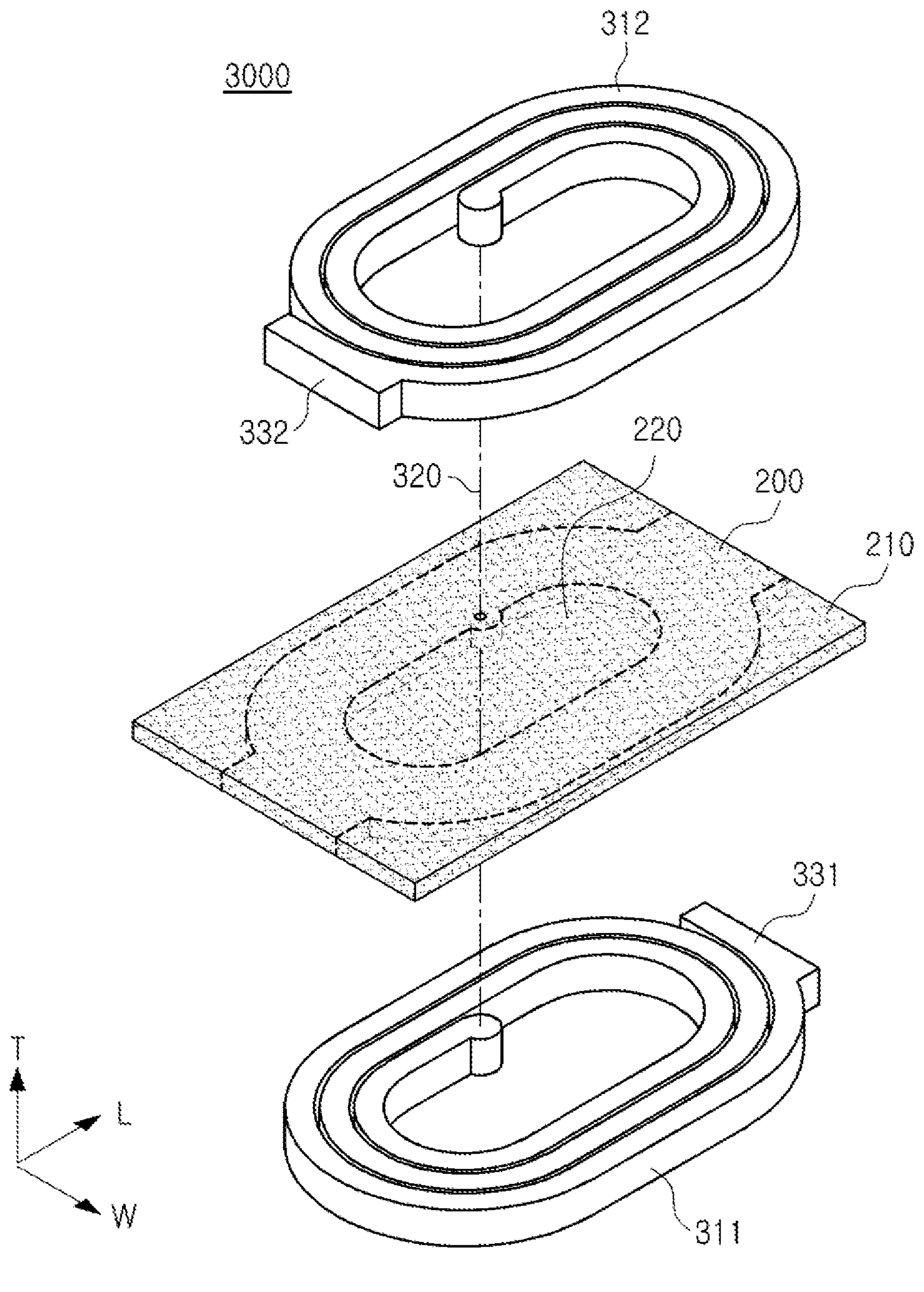
FIG. 8 is a diagram illustrating a connection relationship between the components in FIG. 7, corresponding to FIG. 2.
Figure 9:
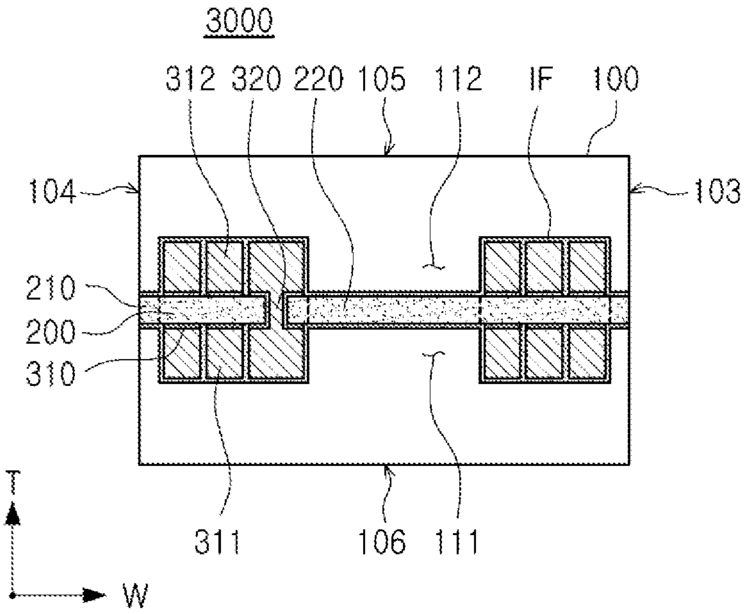
FIG. 9 is a cross-sectional diagram taken along line IV-IV' in FIG. 7, corresponding to FIG. 4.

FIG. 7 is a perspective diagram illustrating a coil component according to a third embodiment. FIG. 8 is a diagram illustrating connection relationship between the components in FIG. 7, corresponding to FIG. 2. FIG. 9 is a cross-sectional diagram taken along line IV-IV' in FIG. 7, corresponding to FIG. 4.

Referring to FIGS. 7 to 9, the coil component 3000 according to the third embodiment may be different from the coil component 1000 according to the first embodiment in that the second non-magnetic layer 220 may be further included in the central region of the coil 300 in the coil component 3000, and accordingly, the core 110 in the through-hole may be divided into upper and lower portions by the second non-magnetic layer 220 in the coil component 3000.

Therefore, in describing the example embodiment, only the second non-magnetic layer 220, the upper core 112, and the lower core 111 different from the first embodiment will be described. For the rest of the components of the example embodiment, the description in the first embodiment may be applied as is.

Referring to FIGS. 7 to 9, the coil component 3000 according to the example embodiment may further include the second non-magnetic layer 220 which may divide the region corresponding to the core 110 of the coil component 1000 according to the first embodiment into two regions.

Since the magnetic flux density passing through the coil 300 is large in the central region of the turn, by additionally disposing the second non-magnetic layer 220 in the core region, Isat properties may be further improved.

Referring to FIG. 8, the second non-magnetic layer 220 may be configured to be in contact with the internal side surface of the support member 200. Here, the internal side surface of the support member 200 may refer to side surfaces directed to the center of the turn of the coil 300 among side surfaces connecting one surface and the other surface of the support member 200 opposing each of in the thickness direction T.

Referring to FIGS. 7 to 9, the second non-magnetic layer 220 may be configured to fill the through-hole 110*h*. That is, the second non-magnetic layer 220 may remain in the trimming process of the support member 200 without being removed, and may be disposed in the region of the through-hole 110*h* of the first embodiment in the central region of the support member 200.

The second non-magnetic layer 220 may include the same material as that of the support member 200.

The second non-magnetic layer 220 may be formed in the same process of forming the support member 200 and may be formed of a thermosetting insulating resin such as an epoxy resin, a thermoplastic insulating resin such as polyimide, or an insulating material including a photosensitive insulating resin, or an insulating material in which the insulating resin is impregnated with a reinforcing material such as glass fiber or inorganic filler. For example, the support member 200 may be formed of an insulating material such as prepreg, Ajinomoto build-up film (ABF), FR-4, bismaleimide triazine (BT) film, and photo imaginable dielectric (PID) film, but an example embodiment thereof is not limited thereto.

As inorganic fillers, at least one selected from a group consisting of silica ($SiO_2$), alumina ($Al_2O_3$), silicon carbide (SiC), barium sulfate ($BaSO_4$), talc, mud, mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$) and calcium zirconate ($CaZrO_3$) may be used.

As described above, as the second non-magnetic layer 220 including the non-magnetic material is disposed in the magnetic path around the coil 300, in particular, the through-hole 110*h* of the central region, the current Isat at which the magnetic flux density is saturated may increase, and accordingly, the coil component 3000 having improved Isat properties such that inductance may be maintained even when a high current is applied may be provided.

Referring to FIGS. 8 and 9, the boundary surface is marked by a dotted line for distinction between the components, but the second non-magnetic layer 220 may be integrally formed with the support member 200. In other words, in the example embodiment, the support member 200, the first non-magnetic layer 210, and the second non-magnetic layer 220 may be integrally formed. Here, the configuration in which first non-magnetic layer 210, and the second non-magnetic layer 220 may be integrally formed may indicate that a boundary line or a boundary surface may not be formed between the second non-magnetic layer 220 and the support member 200.

However, an example embodiment thereof is not limited thereto, and when it is necessary to adjust magnetic permeability of the second non-magnetic layer 220 to be a constant value different from that of the support member 200, the second non-magnetic layer 220 may be formed of a material different from that of the support member 200 in a separate process, such that a boundary line or a boundary surface may be formed between the second non-magnetic layer 220 and the support member 200.

Referring to FIG. 9, the core 110 of the coil component 3000 according to the example embodiment may be divided into two regions, upper and lower regions, and may include a lower core 111 and an upper core 112.

Specifically, the second non-magnetic layer 220 may have one surface and the other surface opposing each other, and the core 110 may include the lower core 111 in contact with one surface of the second non-magnetic layer 220 and a surrounded by the first coil pattern 311, and the upper core 112 in contact with the other surface of the second non-magnetic layer 220 and surrounded by the second coil pattern 312.

In the coil component 3000 according to the example embodiment, by adding the second non-magnetic layer 220 to the core 110 region having high magnetic flux density, the magnetic flux may pass through both the first and second non-magnetic layers 210 and 220 such that Isat properties may be further improved.

Also, since the process of forming the through-hole 110*h* by trimming the central region of the support member 200 may also not be performed, the lead time may be reduced while manufacturing the coil component 3000, thereby increasing production efficiency.

(Effect when Non-Magnetic Layer is Included)

TABLE 1

| (Whether non-magnetic layer is included) | Permeability | Ls (μH) | Isat (A) | Isat increase rate (%) |
|---|---|---|---|---|
| No non-magnetic layer included(ref.) | 22.8 | 1.148 | 3.245 | — |
| First non-magnetic layer | 26.5 | 1.150 | 3.918 | 20.7 |
| First non-magnetic layer + Second non-magnetic layer | 38 | 1.149 | 6.230 | 92 |

Table 1 relates to experimental data on changes in Isat properties depending on whether or not the non-magnetic layer is included in the coil component.

Each sample used in the experiment was a thin-film coil component having a length (L) of 2.0 mm, a width (W) of 1.2 mm, and a thickness (T) of 1.0 mm, and inductance before DC bias current was applied was designed to be the same.

Referring to Table 1, Isat at which the magnetic flux density was saturated and the inductance started to decrease was increased by 20.7%, from 3.245 A to 3.918 A in the sample in which the first non-magnetic layer 210 was included as compared to the same in which the first non-magnetic layer 210 was not included, and in the structure including the first non-magnetic layer 210 and the second non-magnetic layer 220, Isat increased by 92%, from 3.245 A to 6.230 A.

Accordingly, when the coil component having the same inductance value includes the non-magnetic layers 210 and 220, the current value at which the inductance may be maintained may increase, such that the Isat properties may improve.

According to the aforementioned example embodiments, by disposing the non-magnetic layer in the magnetic path around the coil in the coil component, the current (Isat) properties at which the magnetic flux is saturated may improve.

Also, by retaining a portion of the region of the substate in the coil component without being trimmed without adding another process and using the portion as the non-magnetic layer, the lead time may be reduced and production efficiency may be increased.

While the example embodiments have been illustrated and described above, it will be apparent to those skilled in the art that modifications and variations could be made without departing from the scope of the present disclosure as defined by the appended claims.

What is claimed is:

1. A coil component, comprising:

a non-magnetic layer;

a body having first and second surfaces opposing each other, and third and fourth surfaces connected to the first and second surfaces and opposing each other, and including a first portion on one side of the non-magnetic layer and a second portion on another side of the non-magnetic layer with the non-magnetic layer between the first portion and the second portion;

a coil embedded in the body and including a first coil pattern disposed on the one side of the non-magnetic layer and having at least one turn wounded around a central portion of the body, a second coil pattern disposed on the another side of the non-magnetic layer and having at least one turn wounded around the central portion of the body, and a via penetrating through the non-magnetic layer and connecting the first and second coil patterns to each other; and first and second external electrodes disposed on the body and connected to the coil, wherein the non-magnetic layer extends continuously from the first to fourth surfaces to the central portion of the body to separate the first portion and the second portion of the body from each other.

2. The coil component of claim 1, wherein side surfaces of the non-magnetic layer are respectively coplanar with the first to fourth surfaces of the body.

3. The coil component of claim 1, wherein the coil further includes a first lead-out portion extending from the first coil pattern to the first surface of the body, and a second lead-out portion extending from the second coil pattern to the second surface of the body.

* * * * *